May 14, 1929.   W. F. SCHEFFLER   1,713,095
TRUCK AND BAG HOLDER
Filed Feb. 8, 1926   4 Sheets-Sheet 1
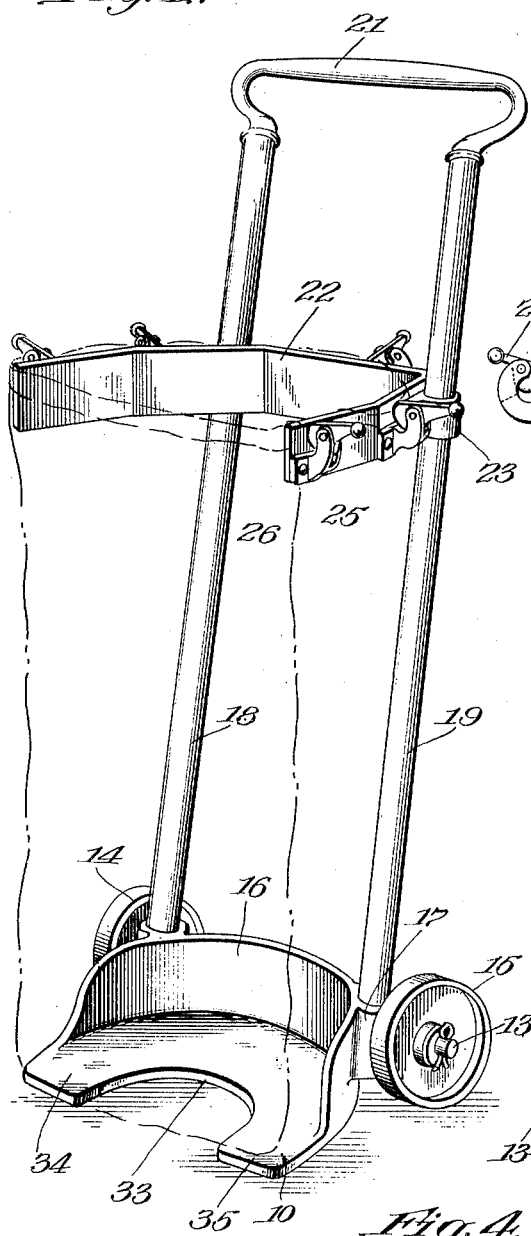
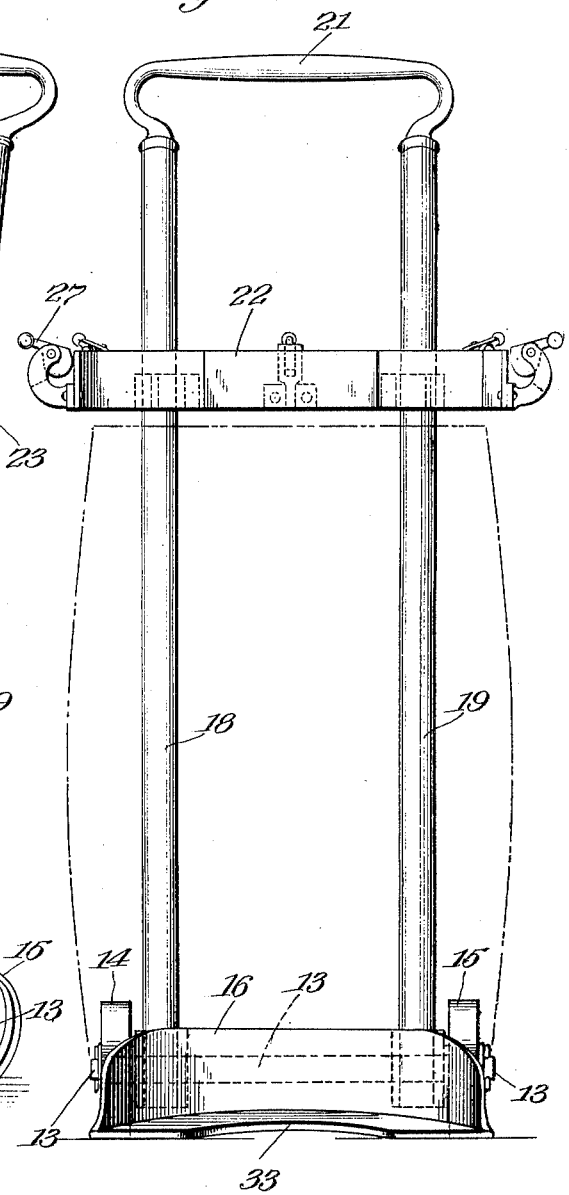
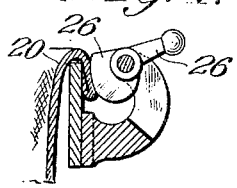
Inventor:
William F. Scheffler.

May 14, 1929.  W. F. SCHEFFLER  1,713,095
TRUCK AND BAG HOLDER
Filed Feb. 8, 1926    4 Sheets-Sheet 2
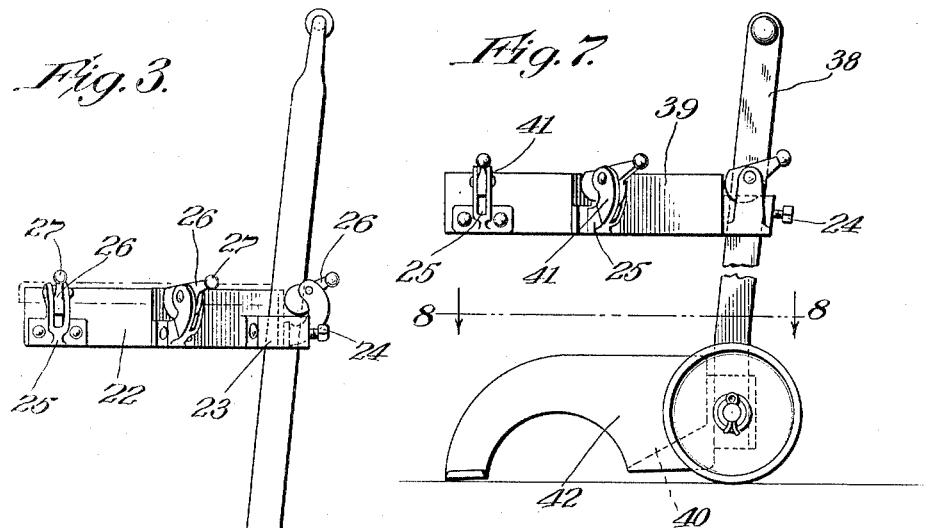
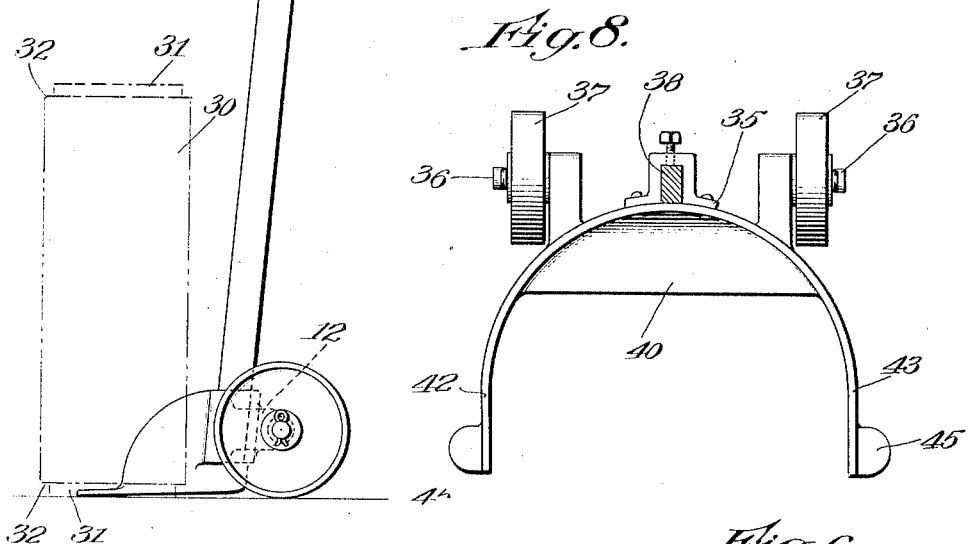
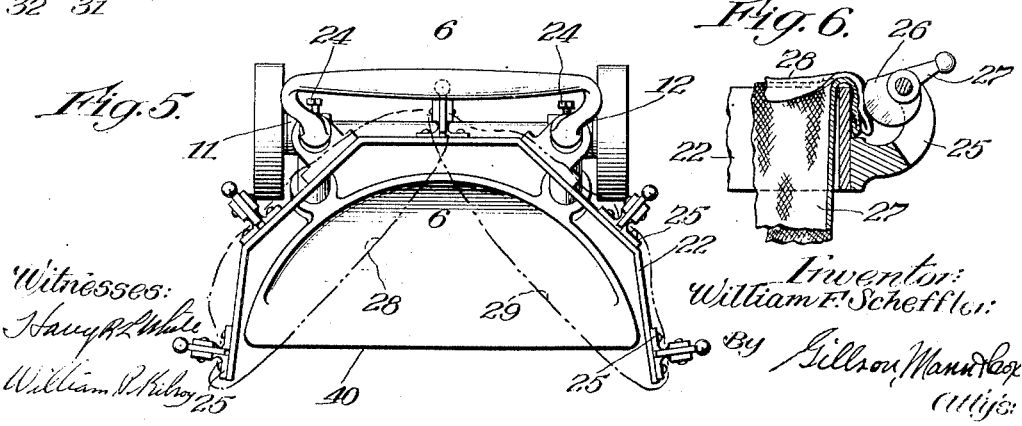
Witnesses:
Inventor:
William F. Scheffler May 14, 1929. W. F. SCHEFFLER 1,713,095
TRUCK AND BAG HOLDER
Filed Feb. 8, 1926 4 Sheets-Sheet 3

Witnesses:
Harry R. L. White
William P. Kilroy

Inventor:
William F. Scheffler
By Gillson, Mann & Cox
Attys.

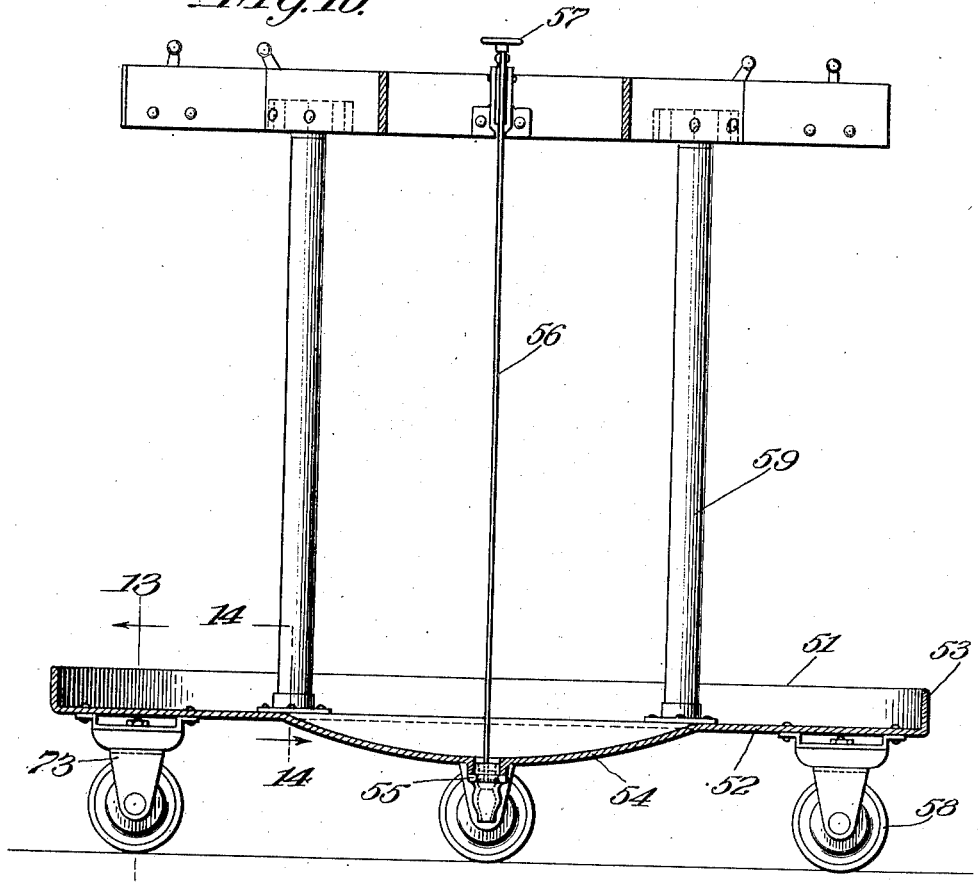

Patented May 14, 1929.

1,713,095

UNITED STATES PATENT OFFICE.

WILLIAM F. SCHEFFLER, OF CHICAGO, ILLINOIS, ASSIGNOR TO CHICAGO MANUFACTURING & DISTRIBUTING COMPANY, OF CHICAGO, ILLINOIS, A CORPORATION OF ILLINOIS.

TRUCK AND BAG HOLDER.

Application filed February 8, 1926. Serial No. 86,876.

This invention relates to combined truck and bag holder, and more particularly to hand trucks on which bag holders are adjustably mounted.

One of the objects of the invention is the provision of a new and improved truck that is provided with new and improved means for engaging and carrying bags, barrels and the like.

Another object of the invention is the provision of a new and improved bag holder.

A further object of the invention is the provision of a combined truck and bag holder that is adapted to support and transport one or a plurality of bags and the like.

A still further object of the invention is the provision of a new and improved combined truck and bag holder that is cheap to manufacture, easily assembled, readily adjusted to accommodate bags of different lengths, efficient in operation, light and durable in construction, and that is not likely to become broken or get out of order.

Other and further objects and advantages of the invention will appear from the following description taken in connection with the accompanying drawings, in which Fig. 1 is a perspective view of the combined truck and bag holder;

Fig. 2 is a front elevation thereof;

Fig. 3 is a side elevation thereof, showing the same in position for loading or lifting a receptacle;

Fig. 4 is a detail showing a vertical section through the bag holder;

Fig. 5 is a plan view of the device, with a modified form of platform, and showing in dotted lines a plurality of bags in position on the holder;

Fig. 6 is a vertical section on line 6—6 of Fig. 5;

Fig. 7 is a side elevation of a modified form of the device;

Fig. 8 is a horizontal section on line 8—8 of Fig. 7;

Fig. 10 is a vertical section on line 10—10 of Fig. 9;

Fig. 13 is a section on line 13—13 of Fig. 10; and

Fig. 14 is a section on line 14—14 of Fig. 10.

Figure 9:
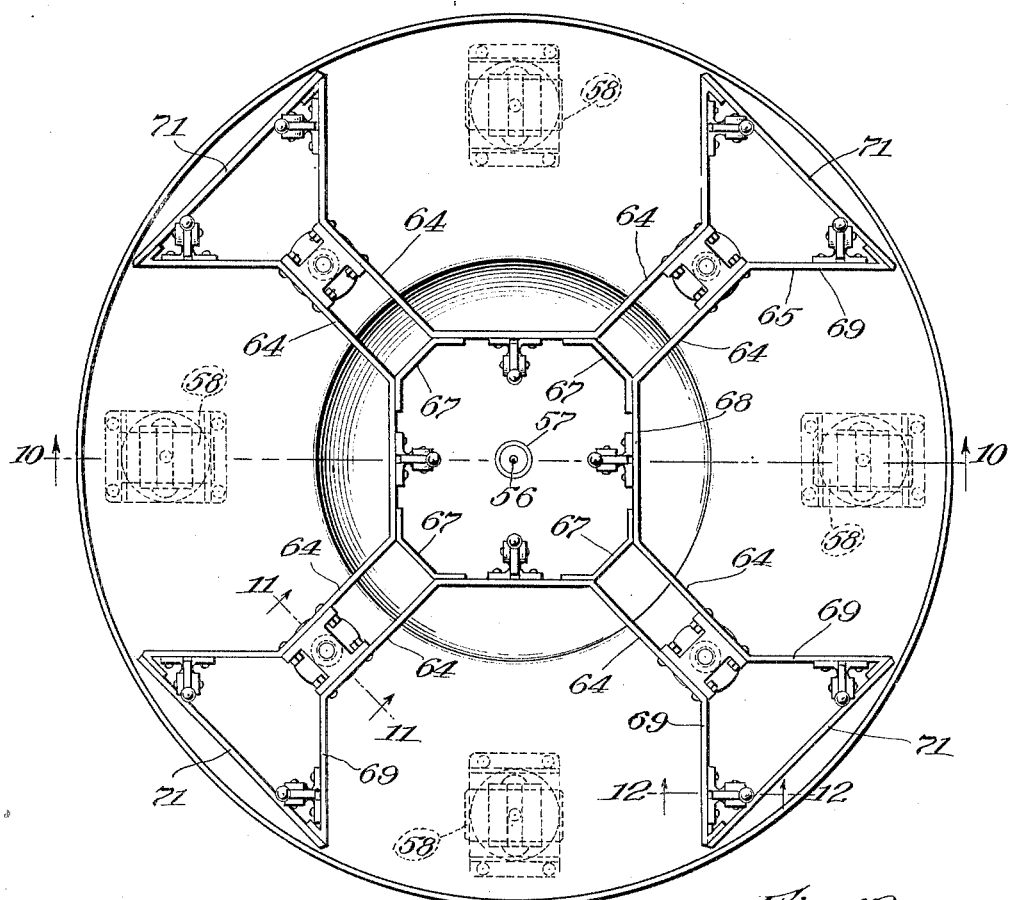
Fig. 9 is a plan view of a modified form of truck, showing a plurality of bag holders in position thereon.

In the use of hand trucks, especially about factories and warehouses, it is often necessary to change from holding and transferring bags to transporting barrels, boxes and the like, and for this reason a truck that is adapted for universal use is desirable. A truck admirably adapted for this purpose is disclosed on the drawings, and will now be described.

Referring now more particularly to Figs. 1 to 3, the reference character 10 designates a platform, bottom or supporting plate which is adapted to form a support for the articles while they are being transported. The plate 10 is provided at its rear edge with a pair of brackets 11 and 12 to which is rigidly secured the axle 13. A pair of wheels 14 and 15 are rotatably mounted on the ends of the axle in the usual manner. The plate 10 is provided with a curved upstanding flange 16 which not only forms a cradle or seat for the articles while they are being transported, but also acts as a shield for the wheels. The flange 16 is provided with bracket members 17 to which suitable standards 18 and 19 are rigidly secured. The upper ends of these standards are connected together by the handle member 21 which is used for moving and directing the truck and for pivoting the frame about the axle 13 for raising the platform above the floor, as is usual in such constructions.

Suitable means are provided for holding a bag in open position. As shown, a bag holder member 22 is provided and the same has loops 23 extending about the standards 18 and 19 for permitting the holder member to be raised and lowered. The holder member is held in adjusted position on the standards by any suitable means as the set screws 24.

It has been found that if the holder 22 be made in the form of a segment of a polygon, articles may be more easily scooped into the bag supported on the holder because the opening formed by the straight sides is held more nearly of uniform width from front to rear than when the holder is semicircular in form. Furthermore, by employing straight sides the attaching flanges for the bag holding clips may all be straight and consequently interchangeable, whereas if the holder be curved the clips would not be interchangeable because of lack of uniformity in the curve at different portions of the holder. The above are considered important features of applicant's device.

In holding bags that are to receive heavy articles such as metal castings and the like, it is necessary that the strain on the bag be distributed in order not to tear the same. Usually this is accomplished by providing a bail for clamping the open end or mouth of the bag for a greater portion of its circumference, but this structure is objectionable because the mechanism is cumbersome and more or less difficult to manipulate. It has been proposed to provide a plurality of individual clamps, but these have been so constructed that the strain on the bag is concentrated at the clamps and consequently the bags are frequently torn by the clamps, especially if they are old or worn.

The present invention employs a plurality of individual clamps, but means are provided whereby the strain on the bags, even though they be entirely supported by the clamps and the member 22, will not be concentrated at the clamps. As shown, the holder member comprises a band to the lower portion of the outside of which a plurality of clamp supports 25 are rigidly secured. The supports 25 extend upwardly and are provided with eccentric clamps 26 each having a weighted handle 27 which normally holds the clamp in clamping position. Each clamp is provided with a clamping portion which is eccentrically pivoted whereby it will grip the bag against the holder.

By means of this arrangement the open end or mouth of the bag 20 is given a short bend over the holder member 22 and passed downward between the clamp and holder as shown in Fig. 4, whereby the weight of the bag and its contents will cause the clamps to grip the same against the support. The friction of the bag due to the short bend about the holder is sufficient to hold the bag. In practice the bag is placed within the holder which is preferably though not necessarily open at its forward side to facilitate its entry, and is then turned or rolled over the holder and pulled downward between the holder and the clamps which automatically grip the same, as clearly indicated in Fig. 4. If considerable strain is likely to be exerted on the bag the same is stretched transversely as it is turned outwardly and downwardly over the support which materially increases the friction between the holder and those portions of the bag between the clamps. This arrangement is considered an important feature of the invention because it permits the bags to be supported entirely by the clamps, if desirable, without injuring the bags.

It is often desirable to support a plurality of open bags adjacent each other as when articles that are being bagged are being sorted into different classes at the same time. With the use of a plurality of clamping members this may be accomplished as indicated in dotted lines in Fig. 4. As shown in this figure two bags 28 and 29 are supported on the same holder and the shape of the holder is such that they are both held open in convenient positions to receive the assorted articles. At their inner sides the two bags are preferably though not necessarily held by a common clamp as shown in Fig. 6.

In the use of the truck the holder 22 is adjusted vertically the proper distance to permit the filled bag or bags to rest on the platform 10 and after the bag is filled and has been transported to the proper place the handles 27 are pushed or struck upwardly to disengage the bag, after which it may be removed from the truck.

It is common practice to employ sheet metal kegs, barrels or containers for shipping hardware and other heavy articles. Due to the great weight of the articles in these kegs or barrels the heads thereof are usually provided with reinforcing ribs or offset portions. In certain types these reinforcing ribs or offset portions 31 of the heads of the kegs or barrels 30 are arranged on the intermediate portions of the heads and extend outwardly whereby circular shoulders 32 are provided at each end of the container.

It is desirable that means be provided for loading these kegs or barrels onto the trucks without necessitating moving the same except by the platform of the truck itself. As shown this is accomplished by providing a curved recess 33 in the central portion of the platform. This recess is large enough to receive the reinforcing ribs or offset portions 31 of the kegs and the side portions 34 and 35 of the platform extend forwardly at each side of the recess and are adapted to engage beneath the shoulder 32 as indicated in Fig. 3. In practice when it is desired to move one of the kegs or barrels of this type, the truck is pushed forwardly with the platform beneath the shoulder 32 so that the recess 33 will engage about the reinforcing portion 31 after which the truck may be tipped backwardly and the container transported wherever desired.

The curved recess 33 in the platform 10 will not materially affect the same as a support for bags since the bags will be supported by the rear and side portions of the platform. The platform, if desired, may be made without the curved recess, that is, with a continuous front edge, as shown at 40 in Fig. 5.

In Figs. 7 and 8 is shown a modified form of the device in which a much more simplified construction is employed. In this form of construction a single standard is used and the base is not provided with a support for the bag. As shown, the base 35 of the device is provided with stub axles 36 on which the wheels 37 are journaled. The base is also provided with an inclined platform or brace 40 and a single standard 38 which is attached thereto in the plane of the stub axles 36 whereby the truck may be easily tipped rearwardly.

A bag holder member 39 provided with a plurality of clamps 41 which are identical with the corresponding elements of the bag holder 22 is adjustably mounted on the standard 38 in a manner similar to that previously described. The bag is adapted to be attached to the holder member 39 in the same manner as that previously described.

Suitable means are provided for preventing the forward tipping of the truck while the bag is being filled. As shown, a pair of arms 42 and 43, one arranged at each side of the truck, is provided for this purpose. These arms extend forwardly and upwardly a sufficient distance to form guides at each side of the bag.

In filling the bags the holder may be so adjusted that the bottom of the bag will rest on the floor, or in contact with the inclined platform 40, or it may be so positioned that the bag will be supported entirely by the said holder. In either event, when the standard 38 is tipped rearwardly the arms 42 and 43 will prevent the bag from moving laterally while it is being transported.

In Figs. 9 to 14 is shown a different type of truck on which the bag holder is especially adapted to be employed. This truck is more particularly adapted to be used as a laundry truck—that is, a truck for moving laundry from the washing to the ironing mechanism, and the like.

In laundries, the washing mechanism comprises large, stationary, cylindrical, horizontally arranged casings in which are journaled rotatable, cylindrical receptacles divided into radial compartments, each compartment being adapted to contain one family's wash. The truck is so constructed that it may be moved in proximity to the cylindrical housing. It is provided with a plurality of bag holders and with castors whereby it may be rotated to bring the bags successively adjacent the housing for receiving the wash from the individual compartments, it being desirable to retain the wash in the various compartments separate and distinct by placing them in different bags.

As shown, each truck 51 comprises a circular base 52 having an upstanding flange 53 about its outer edge and a depression 54 at its central portion for constituting a receptacle for containing the water draining from the clothes. The depressed portion 54 is preferably provided with a valve 55 for permitting the escape of the water from the receptacle. An operating member 56 extends upwardly from the valve and is provided with a handle 57 whereby the valve may be opened from any position about the truck.

The base 52 is provided with one or more bag supporting standards. As shown, four such standards are employed. Each standard 59 is secured to a flanged collar 61 by being telescoped therein, as shown in Fig. 6, and the flanged portion is secured to the base by welding or by rivets, or by any other means that will form a water-tight joint between the flange and the base. Preferably the standards are secured over holes 62 in the base and their upper ends left open, whereby when the whole frame is dipped in enamel, pockets will not be formed in the tubes, with their consequent evil effects.

Figure 11:
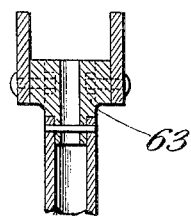
Fig. 11 is a vertical section on line 11—11 of Fig. 9.
Figure 12:
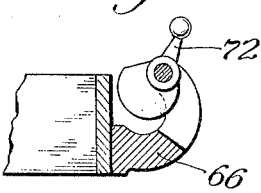
Fig. 12 is a section on line 12—12 of Fig. 9.

The upper ends of the tubes are provided with brackets 63, see Figs. 9 and 11, to which are secured an intermediate side 64 of adjacent bag holders 65. The bag holders, of which four are preferably, though not necessarily, employed, are all alike, and are substantially the same as described above except that only three clamping members 66, see Figs. 9 and 12, are employed. The bag holders are arranged back to back and their intermediate sides 64 are rigidly secured to brackets 63, and are connected together by brackets 67 at their juncture with the rear side members 68. The outer ends of the forward side members 69 may be and preferably are connected together by brace members 71 as clearly shown in Fig. 9.

The clamping members 66 are provided with eccentric clamping members 72 the same as those described above, and are arranged on the lower portion of the holder in the same manner.

The truck is preferably provided with a plurality of castors 73 whereby the truck may be readily rotated to bring the different bags into convenient position to receive and to retain in separate bags the batches of clothes contained in the separate receptacles.

It is very important that the trucks be kept enameled in order that rust from the same shall not injure the clothes. Since the truck is subjected to heat moisture almost continuously it is necessary that it be enameled more or less frequently. The castors, being beneath the base, do not come in contact with the laundry and consequently it is desirable that means be provided whereby they may be removed when the truck is to be enameled.

As shown, the base is provided on its under side with four brackets 74 to which the castor block 75 is adapted to be detachably connected as by means of the bolts 76. A bifurcated member or yoke 77 is swiveled to the block 75 as by means of the rivet or bolt 78. A castor wheel 79 is rotatably mounted in the yoke 77 in the usual manner. The wheel 79 may, if desired, be provided with a rubber tire 81.

When it is desired to enamel the truck the castors are removed and the whole truck dipped into the enamel in the usual manner.

It will thus be seen that the truck is provided with a plurality of bag holders compactly arranged and that the truck, being provided with a circular base or platform supported by castors, may be easily turned and readily moved into position alongside the cylindrical casing of the washing mechanism to fill the different bags from as many different compartments in the washing receptacle.

I claim as my invention:

1. A bag holder comprising a band member in the form of a segment of a polygon, eccentric clamps on the outer lower portion of each of the sides of said band member for clamping the overturned end of a bag against said sides, said eccentrics being so arranged that the weight of the bag when attached will tend to prevent their accidental release, and means for releasing said eccentrics for removing the overturned end of said bag.

2. A bag holder member comprising a segmental band about which the upper open end of a bag is adapted to be turned and a plurality of eccentrics mounted on the lower outer portion of said band for clamping said turned end against said band, the inner portions of said eccentrics moving upwardly for clamping said end whereby the tension on said bag due to its weight will cause said turned end to be more firmly gripped by said eccentrics.

In testimony whereof I affix my signature.

WILLIAM F. SCHEFFLER.